(12) United States Patent
Sterbling et al.

(10) Patent No.: US 11,777,856 B1
(45) Date of Patent: Oct. 3, 2023

(54) SYSTEM AND METHOD OF DYNAMICALLY FILTERING DATA

(71) Applicant: SAP SE, Walldorf (DE)

(72) Inventors: Sven Sterbling, Boblingen (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/728,353

(22) Filed: Apr. 25, 2022

(51) Int. Cl.
| | |
|---|---|
| *G06F 15/16* | (2006.01) |
| *H04L 47/20* | (2022.01) |
| *H04L 47/28* | (2022.01) |
| *H04L 67/289* | (2022.01) |
| *H04L 67/1012* | (2022.01) |

(52) U.S. Cl.
CPC .............. *H04L 47/20* (2013.01); *H04L 47/28* (2013.01); *H04L 67/1012* (2013.01); *H04L 67/289* (2013.01)

(58) Field of Classification Search
CPC ..... H04L 47/20; H04L 47/28; H04L 67/1012; H04L 67/289
See application file for complete search history.

(56) References Cited

U.S. PATENT DOCUMENTS

| | | | | |
|---|---|---|---|---|
| 9,497,068 | B1 * | 11/2016 | Krishnamurthy | H04L 67/535 |
| 10,893,329 | B1 * | 1/2021 | Trim | G06V 20/46 |
| 2018/0358009 | A1 * | 12/2018 | Daley | G06F 3/167 |
| 2020/0127953 | A1 * | 4/2020 | Maddipati | G06F 21/6245 |
| 2020/0275225 | A1 * | 8/2020 | Proctor, Jr. | G06F 3/165 |
| 2022/0312075 | A1 * | 9/2022 | Dhiman | G06N 20/00 |
| 2023/0019180 | A1 * | 1/2023 | de Nijs | G06F 21/577 |

FOREIGN PATENT DOCUMENTS

| | | | | | |
|---|---|---|---|---|---|
| CN | 111354097 | A | * | 6/2020 | ......... B64D 11/0015 |
| CN | 114547698 | A | * | 5/2022 | |
| CN | 115378626 | A | * | 11/2022 | |
| EP | 3455778 | B1 | * | 9/2020 | ........... G06F 21/554 |
| JP | 022523496 | A | * | 4/2022 | |
| WO | WO-2020227114 | A1 | * | 11/2020 | ............. G05B 15/02 |

* cited by examiner

*Primary Examiner* — Richard G Keehn
(74) *Attorney, Agent, or Firm* — SCHWEGMAN LUNDBERG & WOESSNER, P.A.

(57) ABSTRACT

Techniques for dynamically filtering data streams are disclosed. In some embodiments, a computer system performs a method comprising: obtaining one or more metrics of a cloud computing environment, the cloud computing environment including a data source, a data consumer, and a network, the data source configured to transmit data to the data consumer via the network; determining a filtering rule based on the one or more metrics, the filtering rule corresponding to a data filtering operation that modifies data transmissions; and configuring a filter adapter of the data source to apply the data filtering operation of the filtering rule to the data transmissions from the data source to the data consumer.

18 Claims, 6 Drawing Sheets

| DATA CONSUMER | FILTERING RULE | PRIORITY LEVEL |
|---|---|---|
| APPLICATION A | RULE A1 | 1 |
| | RULE A3 | 2 |
| | RULE A4 | 3 |
| | RULE A5 | 4 |
| | RULE A1 | 5 |
| APPLICATION B | RULE B2 | 1 |
| | RULE B3 | 2 |
| | RULE B4 | 3 |
| | RULE A5 | 4 |
| | ... | 5 |
| ... | | ... |

SYSTEM AND METHOD OF DYNAMICALLY FILTERING DATA

BACKGROUND

Modern cloud-based applications often consume a high volume of data at high velocity from different and dispersed data sources.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
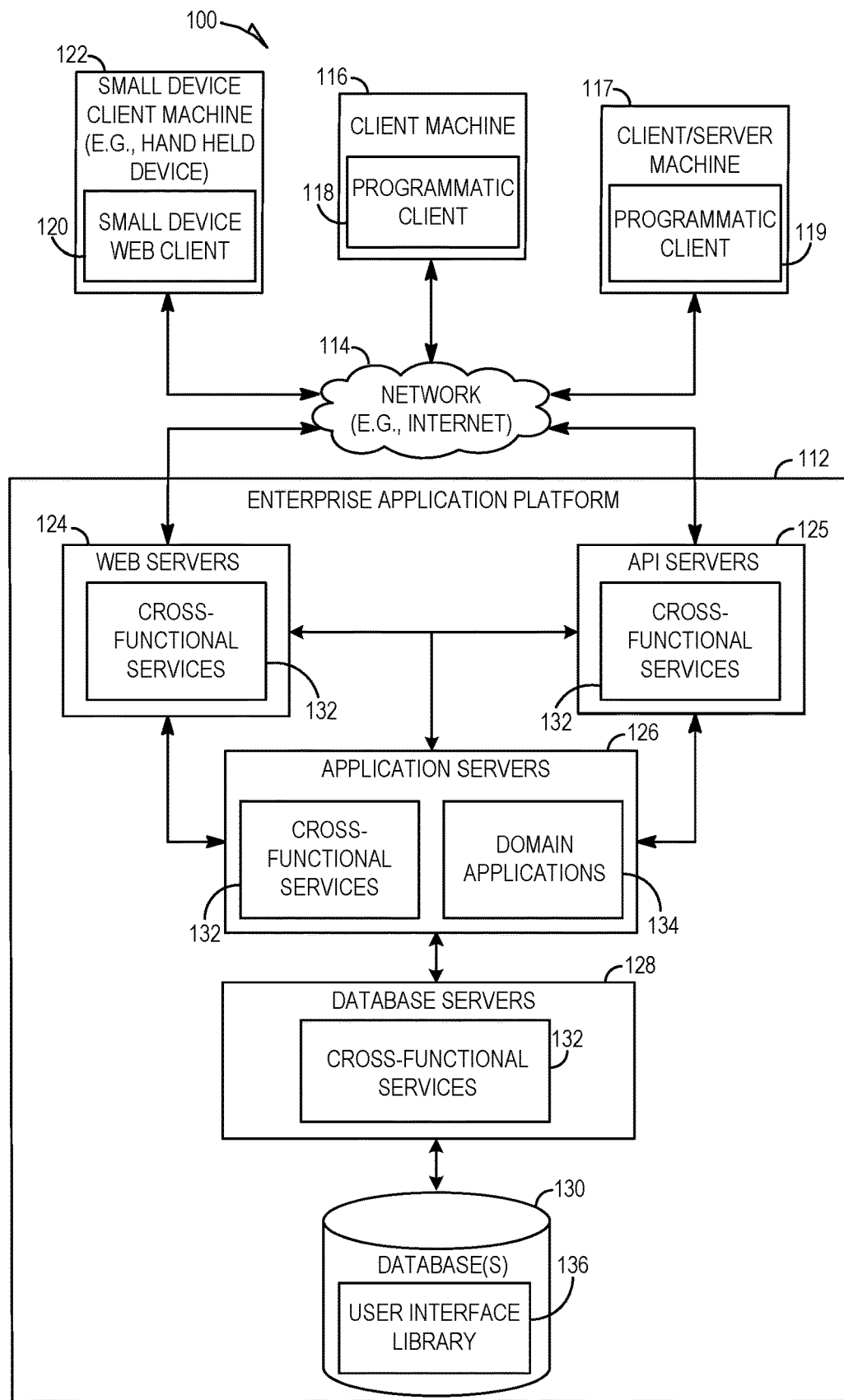
FIG. 1 is an example network diagram illustrating a system.

Example methods and systems for dynamically filtering data are disclosed. In the following description, for purposes of explanation, numerous specific details are set forth in order to provide a thorough understanding of example embodiments. It will be evident, however, to one skilled in the art that the present embodiments can be practiced without these specific details.

Modern cloud environments are becoming large and complex, making the management of connections and relationships between data sources and data consumers difficult. These cloud environments place high demands on data integration capabilities, often involving the transmission of terabytes of data per minute. Physical resource limitations are reached in complex cloud environments, as the data sources, data consumers, networks, and other infrastructure components are overloaded. As a result, the functioning of cloud computing environment and its underlying components suffers. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide dynamic filtering of data. In some example embodiments, a computer system uses a cloud controller that dynamically determines filtering rules based on metrics of a cloud computing environment, and then applies the filtering rules on data sources by configuring filtering adapters of the data sources to apply the corresponding filtering rules before data is sent from the data sources to the data consumers. Because the filtering rules are configured on a data consumer per data consumer basis, considering filtering rules that are specific to each data consumer as the specific metrics of the cloud computing environment on which the data consumer is running, the data stream originating from the data source is filtered specifically for the data consumer. As a result, the computer system provides effective filtering of data that dynamically adjusts filtering rules based on metrics of the cloud computing environment, thereby reducing the risk of overloading the resources of the cloud computing environment. The computer system can dynamically react to changes in cloud infrastructure, such as a dramatic increase in network load or a temporary spike in central processing unit (CPU) utilization for the data consumer. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
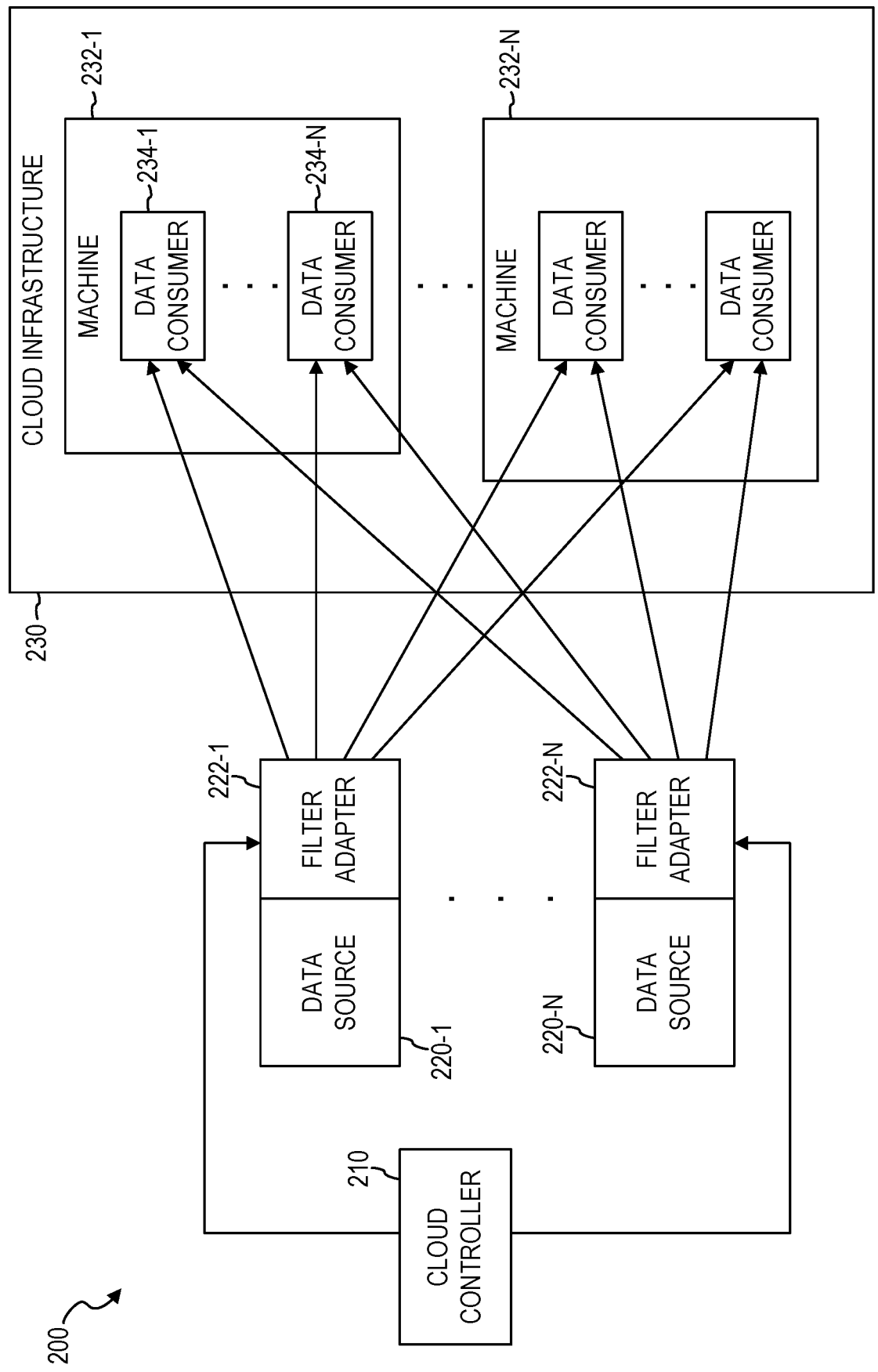
FIG. 2 is a block diagram illustrating an example cloud computing environment.

FIG. 2 is a block diagram illustrating an example cloud computing environment 200. The cloud computing environment 200 may comprise a cloud controller 210, one or more data sources 220, and one or more data consumers 234. In some example embodiments, one or more of the components of the cloud computing environment 200 may be implemented by the enterprise application platform 112 of FIG. 1. For example, the data consumers 234 may be incorporated into the application server(s) 126, and the cloud controller 210 and the data sources 220 may be incorporated into the application servers 126 or the database servers 128. However, the cloud computing environment 200 may be implemented in other ways as well.

In some example embodiments, the data source 220 is configured to transmit data to the data consumer 234 via the network 114. The data source 220 may comprise a software application, a data lake (e.g., a system or repository of data stored in its natural/raw format), or an Internet of Things (IoT) component (e.g., a sensor or a programmable logic controller). Other types of data sources 220 are also within the scope of the present disclosure. In some example embodiments, the data source 220 is included in a plurality of data sources 220 (e.g., data sources 220-1 to 220-N) within the cloud computing environment 200, and each one of the plurality of data sources 220 is configured to transmit data to the data consumer 234 via the network 114.

The data consumer 234 may comprise a cloud-based software application and reside within a cloud infrastructure 230. The cloud infrastructure 230 may include the hardware and software components, such as servers, storage, networking, virtualization software, services and management tools, that support the computing requirements of a cloud computing model. Other types and configurations of data consumers 234 are also within the scope of the present disclosure. The data source 220 may be configured to transmit, via the network 114, data to a plurality of data consumers 234 (e.g., data consumers 234-1 to 234-N) within the cloud computing environment 200. Furthermore, the data source 220 may be configured to transmit data to different data consumers 234 on different machines 232 in different cloud infrastructures 230. For example, the data source 220-1 may be configured to transmit data to data consumers 234 on the machine 232-1 and to data consumers 234 on the machine 232-N. Additionally, the data source 220 may be configured to transmit data to different data consumers 234 in different cloud infrastructures 230.

In some example embodiments, the cloud controller 210 is configured to obtain one or more metrics of a cloud computing environment 200. The cloud controller 210 may obtain the metrics in a variety of ways. For example, components of the cloud computing environment 200 may push or otherwise transmit the metrics directly to the cloud controller 210 or the cloud controller 210 may access and retrieve the metrics from a database (e.g., from database 130 in FIG. 1) in which the metrics are stored. Other ways of obtaining the metrics of the cloud computing environment 200 are also within the scope of the present disclosure.

The one or more metrics of the cloud computing environment 200 may comprise one or more metrics of the data consumer 234. The one or more metrics of the data consumer 234 may comprise at least one of: an availability metric (e.g., an uptime measurement indicating the percentage of time a service or system is available to serve requests, a downtime measurement indicating the percentage of time a service or system is unavailable to serve requests), a central processing unit (CPU) utilization metric (e.g., a measure of the percentage of compute units used by a data consumer), a memory utilization metric (e.g., a measure of memory usage), a disk usage metric (e.g., a number of reads and writes per second), a metric of received requests (e.g., a number of requests received by a data consumer per minute), a latency metric (e.g., a measure of delay in responding to a request), an error rate metric (e.g., a measure of how often a request results in an error), a load capacity metric (e.g., the maximum demand, stress, or load that may be placed on a data consumer under normal or otherwise specified conditions for an extended period of time), or an application topology metric (e.g., details of the infrastructure resources of the data consumer). Other types of metrics of the data consumer 234 are also within the scope of the present disclosure.

Additionally or alternatively, the one or more metrics of the cloud computing environment 200 may comprise one or more metrics of the network 114. The one or more metrics of the network 114 may comprise at least one of: a latency metric (e.g., a measure of delay in communication over a network), a jitter metric (e.g., a measure of variance in latency), a packet loss metric (e.g., a measure of how many packets of data travelling across a network fail to reach their destination), a bandwidth metric (e.g., a maximum rate of data transfer across a network), or a throughput metric (e.g., a rate of successful message delivery over a network). Other types of metrics of the network 114 are also within the scope of the present disclosure.

Additionally or alternatively, the one or more metrics of the cloud computing environment 200 may comprise one or more metrics of the data source 220. The one or more metrics of the data source 220 may comprise at least one of: a consumption metric (e.g., a measure of how many data consumers a data source is serving or an amount of data a data source is serving to data consumers) or an outage metric (e.g., a measure of how many outages are suffered by a data source over a period of time). Other types of metrics of the data source 220 are also within the scope of the present disclosure.

In some example embodiments, the cloud controller 210 is configured to determine a filtering rule based on the one or more metrics, at operation 420. The filtering rule may correspond to a data filtering operation that reduces or otherwise modifies data transmissions. For example, the filtering rule may comprise an instruction to perform a data filtering operation that includes compressing a payload of a data transmission from the data source 220 to the data consumer 234, omitting a portion of data from a payload of a data transmission from the data source 220 to the data consumer 234 (e.g., only transmitting the first one-hundred characters of the payload), or preventing any data transmission at all from the data source 220 to the data consumer 234. Other types of data filtering operations are also within the scope of the present disclosure.

In some example embodiments, the cloud controller 210 is configured to compute a priority level based on the one or more metrics. The cloud controller 210 may use an algorithm that compares each one of the one or more metrics to one or more corresponding threshold values, and then compute the priority level based on the difference between each metric and its corresponding threshold value. Other ways of computing the priority level are also within the scope of the present disclosure. The cloud controller 210 may then determine the filtering rule based on the computed priority level. The cloud controller 210 may also use the identification of the data consumer 234 in determining the filtering rule, thereby selecting a filtering rule that is specific to the particular data consumer 234 for which the filtering rule is to be applied by the data source 220.

Figure 3:
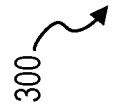
FIG. 3 illustrates an example mapping of filtering rules with data consumers and priority levels.

FIG. 3 illustrates an example mapping 300 of filtering rules (e.g., RULE A1, RULE A2, . . . ) with data consumers (e.g., APPLICATION A, APPLICATION B, . . . ) and priority levels (e.g., 1, 2, . . . ). The mapping 300 may be stored by the cloud controller 210 and then accessed by the cloud controller 210 to determine the filtering rule to apply to the data source 220 for the data consumer 234. For example, after determining the priority level for a specific data source 220, data consumer 234, and network 114, the cloud controller 210 may look up the filtering rule that corresponds to the specific data consumer for the determined priority level in the stored mapping 300. The types of associations included in the mapping 300 may be stored for each data source 220, thereby enabling the cloud controller 210 to determine the filtering rule for any given combination of data source 220, data consumer 234, and priority level.

In some example embodiments, the same filtering rule may be used for the two different priority levels for the same data consumer 234. For example, in FIG. 3, the mapping 300 shows a filtering rule "RULE A1" being used for both a priority level of "1" and a priority level of "2" for data consumer "APPLICATION A." The same filtering rule may also be used across different data consumers 234. For example, in FIG. 3, the mapping 300 shows a filtering rule "A1" being used for data consumer "APPLICATION A" and for data consumer "APPLICATION B." Additionally, different filtering rules may be used for different data consumers 234 even though the same priority level is computed, since the filtering rules may be specific to the data consumer 234 for which they are being applied. For example, in FIG. 3, the filtering rule "RULE A3" for the data consumer "APPLICATION A" given a priority level of "3" is different from the filtering rule "RULE B3" for data consumer "APPLICATION B" given the same priority level of "3."

In some example embodiments, the cloud controller 210 is configured to configure a filter adapter 222 of the data source 220 to apply the data filtering operation of the filtering rule to the data transmissions from the data source 220 to the data consumer 234. Each data source 220 may have its own corresponding filter adapter 222. The filter adapter 222 may comprise an isolated computing component that runs side-by-side with its corresponding data source 220 and intercepts all outgoing traffic from the data source 220. The filter adapter 222 may apply the filtering operation of the filtering rule to the outgoing traffic, thereby reducing or otherwise modifying the data of the outgoing traffic before transmission to the data consumer 234. In some example embodiments, the configuring of the filter adapter 222 comprises pushing the filtering rule to the filter adapter 222. However, the cloud controller 210 may configure the filter adapter 222 of the data source 220 in other ways as well. By filtering data close to the data source 220 via the filter adapter 222 of the data source 220, several technical improvements are achieved, such as a reduction in network load, a reduction in resource consumption of data consumers 234, and less filtering logic being required at the level of the data consumers 234.

Figure 4:
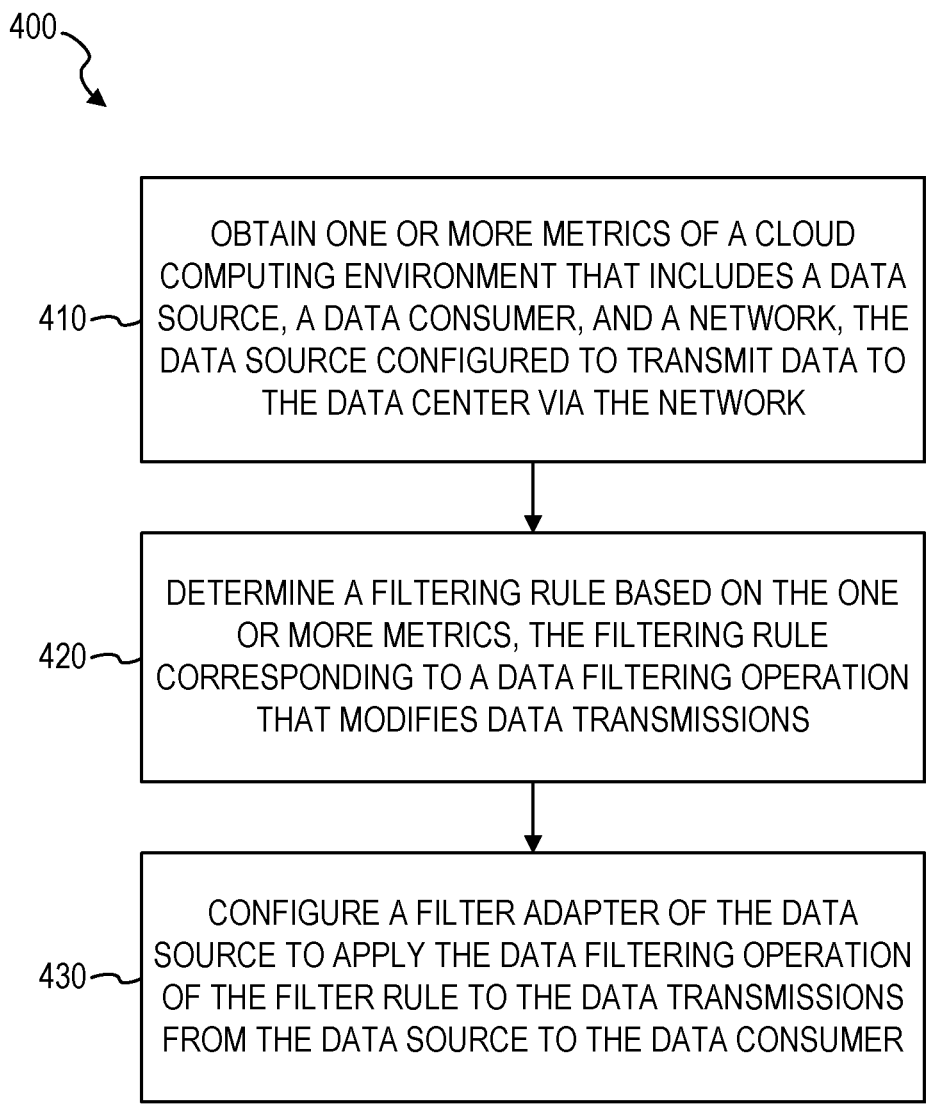
FIG. 4 is a flowchart illustrating an example method of dynamically filtering data streams.

FIG. 4 is a flowchart illustrating an example method 400 of dynamically filtering data streams. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the cloud controller 210 of FIG. 2.

At operation 410, the cloud controller 210 may obtain one or more metrics of a cloud computing environment 200, the cloud computing environment 200 including a data source 220, a data consumer 234, and a network 114. In some example embodiments, the data source 220 is configured to transmit data to the data consumer 234 via the network 114. The data source 220 may comprise a software application, a data lake, or an Internet of Things (IoT) component. Other types of data sources 220 are also within the scope of the present disclosure. The data consumer 234 may comprise a cloud-based software application. Other types of data consumers 234 are also within the scope of the present disclosure. In some example embodiments, the data source 220 is included in a plurality of data sources 220 within the cloud computing environment 200 that are configured to transmit data to the data consumer 234 via the network 114. Additionally or alternatively, the data source 220 may be configured to transmit, via the network 114, data to a plurality of data consumers 234 within the cloud computing environment 200.

In some example embodiments, the one or more metrics of the cloud computing environment 200 comprise one or more metrics of the data consumer 234. The one or more metrics of the data consumer 234 may comprise at least one of: an availability metric, a central processing unit (CPU) utilization metric, a memory utilization metric, a disk usage metric, a metric of received requests, a latency metric, an error rate metric, a load capacity metric, or an application topology metric. Other types of metrics of the data consumer 234 are also within the scope of the present disclosure.

In some example embodiments, the one or more metrics of the cloud computing environment 200 comprise one or more metrics of the network 114. The one or more metrics of the network 114 may comprise at least one of: a latency metric, a jitter metric, a packet loss metric, a bandwidth metric, or a throughput metric. Other types of metrics of the network 114 are also within the scope of the present disclosure.

In some example embodiments, the one or more metrics of the cloud computing environment 200 comprise one or more metrics of the data source 220. The one or more metrics of the data source 220 may comprise at least one of: a consumption metric or an outage metric. Other types of metrics of the data source 220 are also within the scope of the present disclosure.

Next, the cloud controller 210 may determine a filtering rule based on the one or more metrics, at operation 420. In some example embodiments, the filtering rule corresponds to a data filtering operation that reduces or otherwise modifies data transmissions. For example, the filtering rule may comprise an instruction to perform a data filtering operation that includes compressing a payload of a data transmission from the data source 220 to the data consumer 234, omitting a portion of data from a payload of a data transmission from the data source 220 to the data consumer 234 (e.g., only transmitting the first one-hundred characters of the payload), or preventing any data transmission at all from the data source 220 to the data consumer 234. Other types of data filtering operations are also within the scope of the present disclosure.

Then, at operation 430, the cloud controller 210 may configure a filter adapter 222 of the data source 220 to apply the data filtering operation of the filtering rule to the data transmissions from the data source 220 to the data consumer 234. In some example embodiments, the configuring of the filter adapter 222 comprises pushing the filtering rule to the filter adapter 222. However, the cloud controller 210 may configure the filter adapter 222 of the data source 220 in other ways as well.

It is contemplated that any of the other features described within the present disclosure can be incorporated into the method 400.

Figure 5:
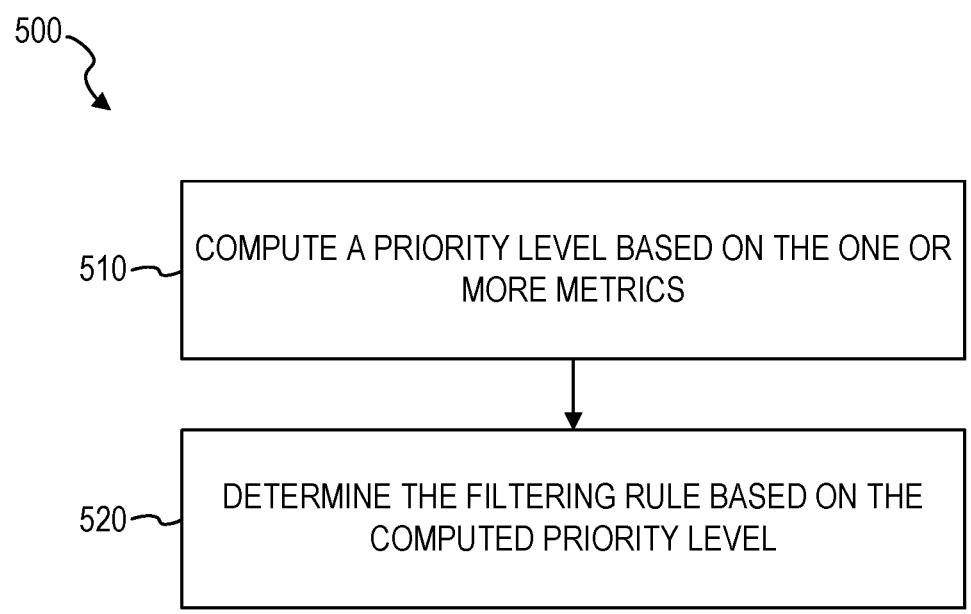
FIG. 5 is a flowchart illustrating an example method of determining a filtering rule based on one or more metrics.

FIG. 5 is a flowchart illustrating an example method 500 of determining a filtering rule based on one or more metrics. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the cloud controller 210 of FIG. 2.

At operation 510, the cloud controller 210 may compute a priority level based on the one or more metrics. In some example embodiments, the cloud controller 210 may use an algorithm that compares each one of the one or more metrics to one or more corresponding threshold values, and then computes the priority level based on the difference between each metric and its corresponding threshold value. Other ways of computing the priority level are also within the scope of the present disclosure.

Then, the cloud controller 210 may determine the filtering rule based on the computed priority level, at operation 520. In some example embodiments, the determining of the filtering rule is further based on an identification of the data consumer 234. For example, the cloud controller 210 may select a first filtering rule for a first data consumer 234-1 (e.g., an analytics application) and a second filtering rule for a second data consumer 234-N (e.g., a reporting application), where the first filtering rule is different from the second filtering rule even though the same priority level is computed for both the first data consumer 234-1 and the second data consumer 234-N, since the filtering rules are specific to the data consumer 234 for which they are being applied.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: obtaining one or more metrics of a cloud computing environment, the cloud computing environment including a data source, a data consumer, and a network, the data source configured to transmit data to the data consumer via the network; determining a filtering rule based on the one or more metrics, the filtering rule corresponding to a data filtering operation that modifies data transmissions; and configuring a filter adapter of the data source to apply the data filtering operation of the filtering rule to the data transmissions from the data source to the data consumer.

Example 2 includes the computer-implemented method of example 1, wherein the data source comprises a software application, a data lake, or an Internet of Things (IoT) component.

Example 3 includes the computer-implemented method of example 1 or example 2, wherein the data source is included in a plurality of data sources within the cloud computing environment that are configured to transmit data to the data consumer via the network.

Example 4 includes the computer-implemented method of any one of examples 1 to 3, wherein the data consumer comprises a cloud-based software application.

Example 5 includes the computer-implemented method of any one of examples 1 to 4, wherein the data source is configured to transmit, via the network, data to a plurality of data consumers within the cloud computing environment, the plurality of data consumers including the data consumer.

Example 6 includes the computer-implemented method of any one of examples 1 to 5, wherein the one or more metrics of the cloud computing environment comprise one or more metrics of the data consumer.

Example 7 includes the computer-implemented method of any one of examples 1 to 6, wherein the one or more metrics of the data consumer comprise at least one of: an availability metric, a central processing unit (CPU) utilization metric, a memory utilization metric, a disk usage metric, a metric of received requests, a latency metric, an error rate metric, a load capacity metric, or an application topology metric.

Example 8 includes the computer-implemented method of any one of examples 1 to 7, wherein the one or more metrics of the cloud computing environment comprise one or more metrics of the network.

Example 9 includes the computer-implemented method of any one of examples 1 to 8, wherein the one or more metrics of the network comprise at least one of: a latency metric, a jitter metric, a packet loss metric, a bandwidth metric, or a throughput metric.

Example 10 includes the computer-implemented method of any one of examples 1 to 9, wherein the one or more metrics of the cloud computing environment comprise one or more metrics of the data source.

Example 11 includes the computer-implemented method of any one of examples 1 to 10, wherein the one or more metrics of the data source comprise at least one of: a consumption metric or an outage metric.

Example 12 includes the computer-implemented method of any one of examples 1 to 11, wherein the data filtering operation is configured to modify the data transmissions by compressing data in the data transmissions, filtering out a portion of the data from the data transmissions, or blocking the data transmissions.

Example 13 includes the computer-implemented method of any one of examples 1 to 12, wherein the determining the filtering rule comprises: computing a priority level based on the one or more metrics; and determining the filtering rule based on the computed priority level.

Example 14 includes the computer-implemented method of any one of examples 1 to 13, wherein the determining of the filtering rule is further based on an identification of the data consumer.

Example 15 includes the computer-implemented method of any one of examples 1 to 14, wherein the configuring of the filter adapter comprises pushing the filtering rule to the filter adapter.

Example 16 includes a system comprising: at least one processor; and a non-transitory computer-readable medium storing executable instructions that, when executed, cause the at least one processor to perform the method of any one of examples 1 to 15.

Example 17 includes a non-transitory machine-readable storage medium, tangibly embodying a set of instructions that, when executed by at least one processor, causes the at least one processor to perform the method of any one of examples 1 to 15.

Example 18 includes a machine-readable medium carrying a set of instructions that, when executed by at least one processor, causes the at least one processor to carry out the method of any one of examples 1 to 15.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
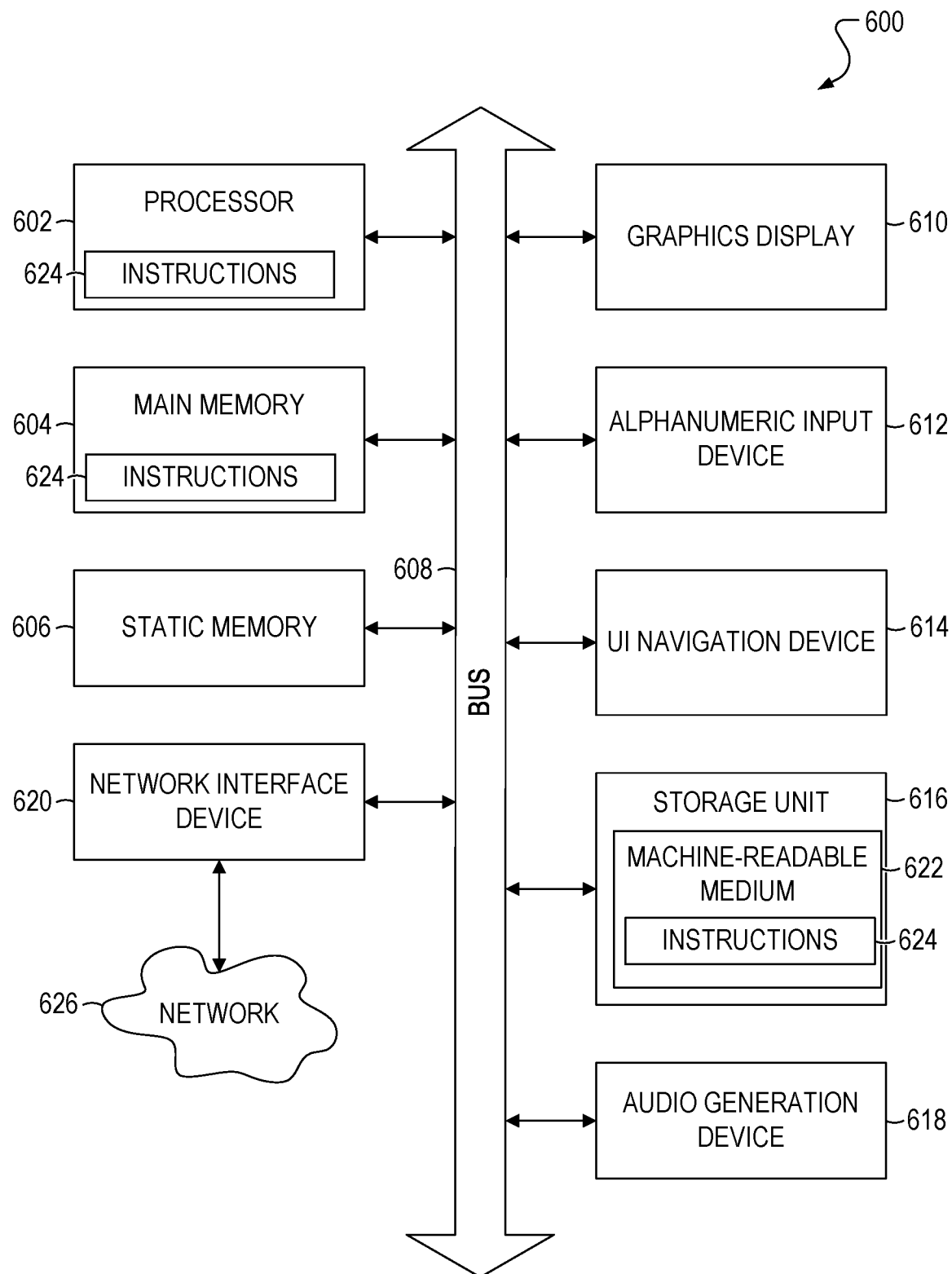
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:

obtaining one or more metrics of a cloud computing environment, the cloud computing environment including a data source, a data consumer, and a network, the data source configured to transmit data to the data consumer via the network, the one or more metrics of the cloud computing environment comprising one or more metrics of the data consumer, the data consumer comprising a cloud-based software application, the one or more metrics of the data consumer comprising at least one of: an uptime measurement indicating a percentage of time that the data consumer is available to serve requests, a downtime measurement indicating a percentage of time that the data consumer is unavailable to serve requests, a central processing unit (CPU) utilization metric, a memory utilization metric, a disk usage metric, a metric of received requests, a latency metric, an error rate metric, a load capacity metric, or an application topology metric;

determining a filtering rule based on the one or more metrics, the filtering rule corresponding to a data filtering operation that modifies data transmissions; and configuring a filter adapter of the data source to apply the data filtering operation of the filtering rule to the data transmissions from the data source to the data consumer.

2. The computer-implemented method of claim 1, wherein the data source comprises a software application, a data lake, or an Internet of Things (IoT) component.

3. The computer-implemented method of claim 1, wherein the data source is included in a plurality of data sources within the cloud computing environment that are configured to transmit data to the data consumer via the network.

4. The computer-implemented method of claim 1, wherein the data source is configured to transmit, via the network, data to a plurality of data consumers within the cloud computing environment, the plurality of data consumers including the data consumer.

5. The computer-implemented method of claim 1, wherein the one or more metrics of the cloud computing environment comprise one or more metrics of the network.

6. The computer-implemented method of claim 5, wherein the one or more metrics of the network comprise at least one of: a latency metric, a jitter metric, a packet loss metric, a bandwidth metric, or a throughput metric.

7. The computer-implemented method of claim 1, wherein the one or more metrics of the cloud computing environment comprise one or more metrics of the data source.

8. The computer-implemented method of claim 7, wherein the one or more metrics of the data source comprise at least one of: a consumption metric or an outage metric.

9. The computer-implemented method of claim 1, wherein the data filtering operation is configured to modify the data transmissions by compressing data in the data transmissions, filtering out a portion of the data from the data transmissions, or blocking the data transmissions.

10. The computer-implemented method of claim 1, wherein the determining the filtering rule comprises:
   computing a priority level based on the one or more metrics; and
   determining the filtering rule based on the computed priority level.

11. The computer-implemented method of claim 10, wherein the determining of the filtering rule is further based on an identification of the data consumer.

12. The computer-implemented method of claim 1, wherein the configuring of the filter adapter comprises pushing the filtering rule to the filter adapter.

13. A system of comprising:
   at least one hardware processor; and
   a non-transitory computer-readable medium storing executable instructions that, when executed, cause the at least one hardware processor to perform operations comprising:
      obtaining one or more metrics of a cloud computing environment, the cloud computing environment including a data source, a data consumer, and a network, the data source configured to transmit data to the data consumer via the network, the one or more metrics of the cloud computing environment comprising one or more metrics of the data consumer, the data consumer comprising a cloud-based software application, the one or more metrics of the data consumer comprising at least one of: an uptime measurement indicating a percentage of time that the data consumer is available to serve requests, a downtime measurement indicating a percentage of time that the data consumer is unavailable to serve requests, a central processing unit (CPU) utilization metric, a memory utilization metric, a disk usage metric, a metric of received requests, a latency metric, an error rate metric, a load capacity metric, or an application topology metric;
      determining a filtering rule based on the one or more metrics, the filtering rule corresponding to a data filtering operation that modifies data transmissions; and
   configuring a filter adapter of the data source to apply the data filtering operation of the filtering rule to the data transmissions from the data source to the data consumer.

14. The system of claim 13, wherein the data source comprises a software application, a data lake, or an Internet of Things (IoT) component.

15. The system of claim 13, wherein the data source is included in a plurality of data sources within the cloud computing environment that are configured to transmit data to the data consumer via the network.

16. A non-transitory machine-readable storage medium tangibly embodying a set of instructions that, when executed by at least one hardware processor, causes the at least one processor to perform operations comprising:
   obtaining one or more metrics of a cloud computing environment, the cloud computing environment including a data source, a data consumer, and a network, the data source configured to transmit data to the data consumer via the network, the one or more metrics of the cloud computing environment comprising one or more metrics of the data consumer, the data consumer comprising a cloud-based software application, the one or more metrics of the data consumer comprising at least one of: an uptime measurement indicating a percentage of time that the data consumer is available to serve requests, a downtime measurement indicating a percentage of time that the data consumer is unavailable to serve requests, a central processing unit (CPU) utilization metric, a memory utilization metric, a disk usage metric, a metric of received requests, a latency metric, an error rate metric, a load capacity metric, or an application topology metric;
   determining a filtering rule based on the one or more metrics, the filtering rule corresponding to a data filtering operation that modifies data transmissions; and
   configuring a filter adapter of the data source to apply the data filtering operation of the filtering rule to the data transmissions from the data source to the data consumer.

17. The non-transitory machine-readable storage medium of claim 16, wherein the data source comprises a software application, a data lake, or an Internet of Things (IoT) component.

18. The non-transitory machine-readable storage medium of claim 16, wherein the data source is included in a plurality of data sources within the cloud computing environment that are configured to transmit data to the data consumer via the network.

* * * * *